(12) United States Patent
Pedemonte et al.

(10) Patent No.: US 11,898,942 B2
(45) Date of Patent: Feb. 13, 2024

(54) METHOD FOR CHECKING WATER SEALING OF INSTRUMENTATION FOR UNDERWATER USE

(71) Applicant: CRESSI-SUB S.p.A., Genoa (IT)

(72) Inventors: Stefano Pedemonte, Genoa (IT); Giuseppe Marenco, Genoa (IT)

(73) Assignee: Cressi-Sub S.p.A., Genoa (IT)

( * ) Notice: Subject to any disclaimer, the term of this patent is extended or adjusted under 35 U.S.C. 154(b) by 722 days.

(21) Appl. No.: 17/046,256

(22) PCT Filed: Apr. 23, 2019

(86) PCT No.: PCT/IB2019/053338
§ 371 (c)(1),
(2) Date: Oct. 8, 2020

(87) PCT Pub. No.: WO2019/207478
PCT Pub. Date: Oct. 31, 2019

(65) Prior Publication Data
US 2021/0140846 A1  May 13, 2021

(30) Foreign Application Priority Data
Apr. 24, 2018  (IT) .................. 102018000004833

(51) Int. Cl.
*G01M 3/32* (2006.01)
*G01M 3/34* (2006.01)
*B63C 11/02* (2006.01)

(52) U.S. Cl.
CPC .......... *G01M 3/3272* (2013.01); *B63C 11/02* (2013.01); *G01M 3/329* (2013.01);
(Continued)

(58) Field of Classification Search
CPC .. G01M 3/3272; G01M 3/3263; G01M 3/329; G01M 3/34; G01M 3/366
See application file for complete search history.

(56) References Cited

U.S. PATENT DOCUMENTS

| 2012/0243854 A1* | 9/2012 | Takimoto | G03B 17/08 |
| | | | 396/26 |
| 2014/0230526 A1* | 8/2014 | Willemin | G04G 21/02 |
| | | | 73/49.3 |

(Continued)

FOREIGN PATENT DOCUMENTS

| EP | 1388766 A1 | 2/2004 |
| EP | 2770380 A1 | 8/2014 |

(Continued)

OTHER PUBLICATIONS

Patent Cooperation Treaty, International Search Report and Written Opinion for International Application No. PCT/IB2019/053338, dated Jun. 26, 2019, 9 pages.

*Primary Examiner* — Paul M. West

(57) ABSTRACT

The present invention relates to instrumentation for underwater use powered by means of a battery and provided with a pressure sensor capable of periodically detecting pressure values inside the main body of the instrumentation.
The present invention also relates to a method for detecting possible pressure drops inside the main body of the instrumentation over time.
The instrumentation of the present invention enables carrying out efficient and inexpensive self-diagnosis of the pressure inside the body of the device, every time the battery is changed or also during manufacture of the instrument.

2 Claims, 4 Drawing Sheets

(52) U.S. Cl.
CPC ............ *G01M 3/3263* (2013.01); *G01M 3/34* (2013.01); *B63C 2011/021* (2013.01)

(56) References Cited

U.S. PATENT DOCUMENTS

2014/0260550 A1    9/2014  Kil et al.
2016/0005296 A1*   1/2016  Kil ........................ G01M 3/002
                                                         340/604

FOREIGN PATENT DOCUMENTS

| WO | WO9406264    A1 | 3/1994  |
| WO | WO2007100788 A2 | 9/2007  |
| WO | WO2007140615 A1 | 12/2007 |

* cited by examiner ial Patent Application No. 102018000004833 filed on Apr. 24, 2018, the disclosures of which are expressly incorporated herein by reference.

METHOD FOR CHECKING WATER SEALING OF INSTRUMENTATION FOR UNDERWATER USE

CROSS-REFERENCE TO RELATED APPLICATIONS

This application claims priority to PCT International Application No. PCT/IB2019/053338 filed on Apr. 23, 2019, which application claims priority to Italian Patent Application No. 102018000004833 filed on Apr. 24, 2018, the disclosures of which are expressly incorporated herein by reference.

STATEMENT RE: FEDERALLY SPONSORED RESEARCH/DEVELOPMENT

Not applicable.

DESCRIPTION

Field of Invention

The present invention relates to the field of instrumentation for underwater use; in particular, the present invention relates to underwater instrumentation containing electronic devices.

State of the Art

Underwater instrumentation, particularly that containing electronic devices, is very sensitive to the possible entry of water inside.

Typically, the water sealing of underwater instrumentation is checked by dedicated equipment during the production phase, and consequently before sale and its effective utilization.

The methods known in the art, most commonly adopted by manufacturers to test underwater devices at the end of the assembly process, are basically of three types: methods carried out in water, in air, or in air and water. Obviously, variants of these three methods are also known.

The first method, carried out in water and conceived for waterproof watches, is performed in two steps: test immersion and successive checking for the presence of water inside the device under test. In detail, after having immersed the instruments to test in a tank full of water, the pressure inside the tank is varied (typical values ranging between 0 and 15 bar) to increase the stress on all the seals of the instruments. When the immersion test is completed, to check that not even a minimum amount of water has entered the devices under test, they are extracted from the tank and heated from the outside, so that even a minimum amount of water inside them would saturate the air contained therein with humidity. At this point, the glass surface of the individual instruments is rapidly cooled (for example, by placing it in contact with icy water or a Peltier cell) and a misting effect is obtained. The amount of condensation visible through the glass will be proportional to the amount of water that may have entered during the immersion test.

Many devices (up to fifty even) can be tested simultaneously with this method carried out in water; however, the test cycle times are rather long, without taking into account the time necessary for drying the plastic materials before performing the test.

The second method, carried out in air, also contemplates a first immersion test step, in which the device to be tested is subjected to external pressure levels (typical values ranging between 0 and 15 bar) such as to stress the seals of the device in air, instead of water as in the first method seen above. The type of container used in this second method carried out in air is extremely small. The immersion test is carried out as follows. The device to be tested is placed in a pressure chamber with a volume slightly larger than that of the device so as to maximize the ratio between the pressure changes inside the pressure chamber and changes in the mass of air contained therein. At this point, the testing machine discharges a predetermined amount of air inside the pressure chamber. This results in an increase in pressure inside the pressure chamber until it stabilizes at a predetermined value. In the case of the device leaking, part of the air introduced into the pressure chamber will enter it, causing a pressure drop in the pressure chamber containing it. Vice versa, in the case where the device is properly sealed, no air will enter it and, in consequence, the pressure inside the pressure test chamber will remain stable at the predetermined value.

This method carried out in air is extremely rapid (for example, approximately 40 seconds), which results in an overall testing time, also including the time necessary for positioning the device, of approximately one minute for each device.

However, the testing method carried out in air has the drawback of only allowing the testing of one device at a time.

The third method, carried out in air and water, differs from the second method in air seen above in the manner whereby the possible entry of air inside the instrument to be tested is determined.

In fact, after exposure to air at pressures greater than atmospheric pressure, the instrument is immersed in water and the ambient pressure is returned to atmospheric pressure value. In this way, any air that may have entered inside the instrument in the step of exposure to high pressures will escape from it, creating air bubbles in the water in which the instrument is immersed.

This test can be performed on a number of instruments in parallel, but not too many such as to confuse the operator carrying out the visual check on bubble production at the end of the test. The testing times for each instrument can be less than a minute.

However, this test has the drawback that it is not possible to discover micro-leaks in the devices under test because of the impossibility of distinguishing small bubbles that leave the device from small bubbles that are commonly produced by air that can remain trapped on the outside of the device.

A common factor of the methods known in the art and described above is that checking for the possible entry of water/air in the instrument to be tested is performed visually or via instrument measurement, but, in any case, always from the outside of the instrument to be tested.

Furthermore, whenever it is necessary to replace the battery that powers the electronic devices contained inside the underwater instrumentation, it is necessary to access the inside of the instrumentation in order to open the compartment inside which the battery is housed.

Battery replacement is often performed by unskilled personnel and without adequate testing tools; this can result in instrumentation failures hazardous for the user.

In consequence, after the battery is replaced, a new check on the sealing of the underwater instrumentation should be required.

The applicant of the present patent application has noted the need to provide an efficient system for checking the sealing of underwater instrumentation, which can be carried out any time as needs require, such as, for example, after the battery replacement operation.

SUMMARY OF INVENTION

In a first aspect, the present invention refers to an instrumentation for underwater use.

The applicant of the present patent application has unpredictably found that the above-indicated drawbacks can be overcome by instrumentation for underwater use that can be powered by a battery and that comprises a watertight main body inside which the following are present:
a housing for said battery;
an opening/closing device capable of setting a first, open condition, or a second, closed condition, of the housing for the battery; and
at least one pressure sensor capable of periodically detecting the pressure values inside said main body of the instrumentation; and, optionally, also a temperature sensor, wherein said instrumentation for underwater use also comprises, or is connected to:
a central unit capable of receiving said pressure values detected by said pressure sensor and comparing them to each other and/or to predetermined pressure values; and
a communication device capable of emitting a signal perceptible by the user depending on the result of said comparison of the pressure values is capable to solve the above mentioned problem In this way, the instrumentation of the present invention enables performing self-diagnosis on the pressure inside the body of the device, implemented through the real-time reading taken by a sensor located directly inside the instrument to be tested, and subsequent interpretation of the values according to a predetermined logic.

The sensor inside the instrument offers the advantage of being able to check for the possible entry of air in an extremely precise and immediate manner.

The instrumentation of the present invention therefore allows automatically checking for possible pressure loss inside the instrumentation every time the battery is replaced, overcoming the above-indicated problems encountered in the known art.

In the same way, the pressure sensor inside the instrumentation of the present invention can also be used to implement checking during manufacture of the instrument.

According to a preferred embodiment, the instrumentation for underwater use according to the present invention comprises electronic devices arranged inside said main body.

According to a preferred embodiment, the instrumentation for underwater use of the present invention comprises waterproof watches, depth gauges, diving computers, and similar devices.

According to a preferred embodiment, the instrumentation for underwater use of present invention can be powered by said battery in a stable manner also during said first open condition of the battery housing.

This enables taking a first measurement with the instrument open; in this way, the pressure value measured in said first open condition of the battery housing is therefore equal to atmospheric pressure.

According to a preferred embodiment, said communication device is capable of emitting a luminous, audible and/or graphical signal.

In this way, the user can be immediately and unequivocally informed about the result, positive or negative, of the test.

According to a preferred embodiment, said central unit is contained on a printed circuit board positioned inside the main body of the instrumentation to be tested.

In this way, it is able to directly collect the values transmitted by the pressure sensor.

In an alternative embodiment, said central unit is remotely positioned with respect to the instrumentation to be tested and connected to the sensor via a Wi-Fi, Bluetooth, Internet, or similar link.

In this way, it is not necessary to position the central unit inside the main body of the instrumentation to be tested.

According to a preferred embodiment, said communication device is a display on which messages notifying the outcome of the test are shown.

According to another preferred embodiment, said communication device is a warning light that lights up depending on whether the test gave a positive or negative result.

According to yet another preferred embodiment, said communication device is an audible device, such as a buzzer, bell or similar, which emits an audible signal depending on whether the test gave a positive or negative result.

In conformity with the present invention, it has been unpredictably found that it is possible to check for a possible air leak in instrumentation for underwater use by means of a method that comprises the following steps:
a) detecting, by means of a pressure sensor, the initial reference pressure P1 inside the main body of said instrumentation for underwater use in a first open condition of the battery housing;
b) setting a second closed condition of the battery housing;
c) detecting, by means of said pressure sensor, the pressure P2 of the air inside said main body of the instrumentation for underwater use after having set said second closed condition of the battery housing;
d) periodically detecting, at time $t_n$, the value $P_n$ of the pressure inside said main body of the instrumentation for underwater use in said second closed condition of the battery housing;
e) transmitting said values P1, P2, $P_n$ to a central unit capable of storing said values and comparing them with one another;
f) activating a communication device capable of emitting a signal perceptible by the user when the drop in the value of pressure $P_n$ detected at time $t_n$ with respect to values P1 and P2 is greater than a predetermined threshold value P3.

In this way, the internal pressure is monitored for a predetermined time and compared with pressures P1 and P2. The extent of the pressure drop in the predetermined time will determine the positive or negative outcome of the test.

When the second closed condition of the housing is created, for example, through the insertion of a sealing cover for the battery housing, because of a piston effect, an increase in pressure is achieved, which arrives to value P2.

The test results determined by the method of the present invention offers the possibility of simultaneously testing an almost unlimited number of instruments by simply sizing a tank in an opportune manner to hold all of them during the step of exposure to the test pressures.

Furthermore, evaluation of the result is performed by the instrument itself and not an operator/external apparatus, with extremely low execution times and costs, as no apparatus external to the instrument to be tested is needed.

According to a preferred embodiment, the pressure $P_n$ is detected at time $t_n$, where $t_n$ is, for example, 1 minute.

According to a preferred embodiment, the predetermined threshold value P3 is preferably equal to approximately 1020 mbar.

In this way, when the difference between the pressure $P_n$ detected by the sensor at time $t_n$ inside the main body of the instrumentation and the pressure P2 measured when the closed condition of the battery housing was created is less than P3, the method of the present invention determines a pressure drop inside the instrumentation, and consequently activates the communication device.

According to a preferred embodiment, said communication device is capable of emitting a luminous, audible and/or graphical signal.

According to a preferred embodiment, the method may also comprise, after step d), a further step d') wherein said instrumentation for underwater use is inserted in a hermetically sealed container, such as an autoclave, and subjected to an external pressure P4 greater than P2. According to a preferred embodiment, said external pressure value P4 is greater than Y1=2 bar, preferably greater than Y2=5 bar, and even more preferably equal to approximately Y3=10 bar.

According to a preferred embodiment, the method also comprises the step e'), successive to step d'), wherein said communication device capable of emitting a signal perceptible by the user is activated in the case where the internal pressure $P_n$ detected at time $t_n$ exceeds the tolerance values with respect to P2 due to deformation of the main body of the instrumentation for underwater use.

In this way, because of the extra steps d') and e') where the instrumentation is subjected to pressures greater than atmospheric pressure, the test provides further guarantees of sealing.

BRIEF DESCRIPTION OF THE FIGURES

Further characteristics and advantages of the present invention shall become clearer from examination of the following detailed description of a preferred, but not exclusive, embodiment, shown by way of non-limitative example, with the aid of the accompanying drawings, in which.

DETAILED DESCRIPTION

Figure 1:
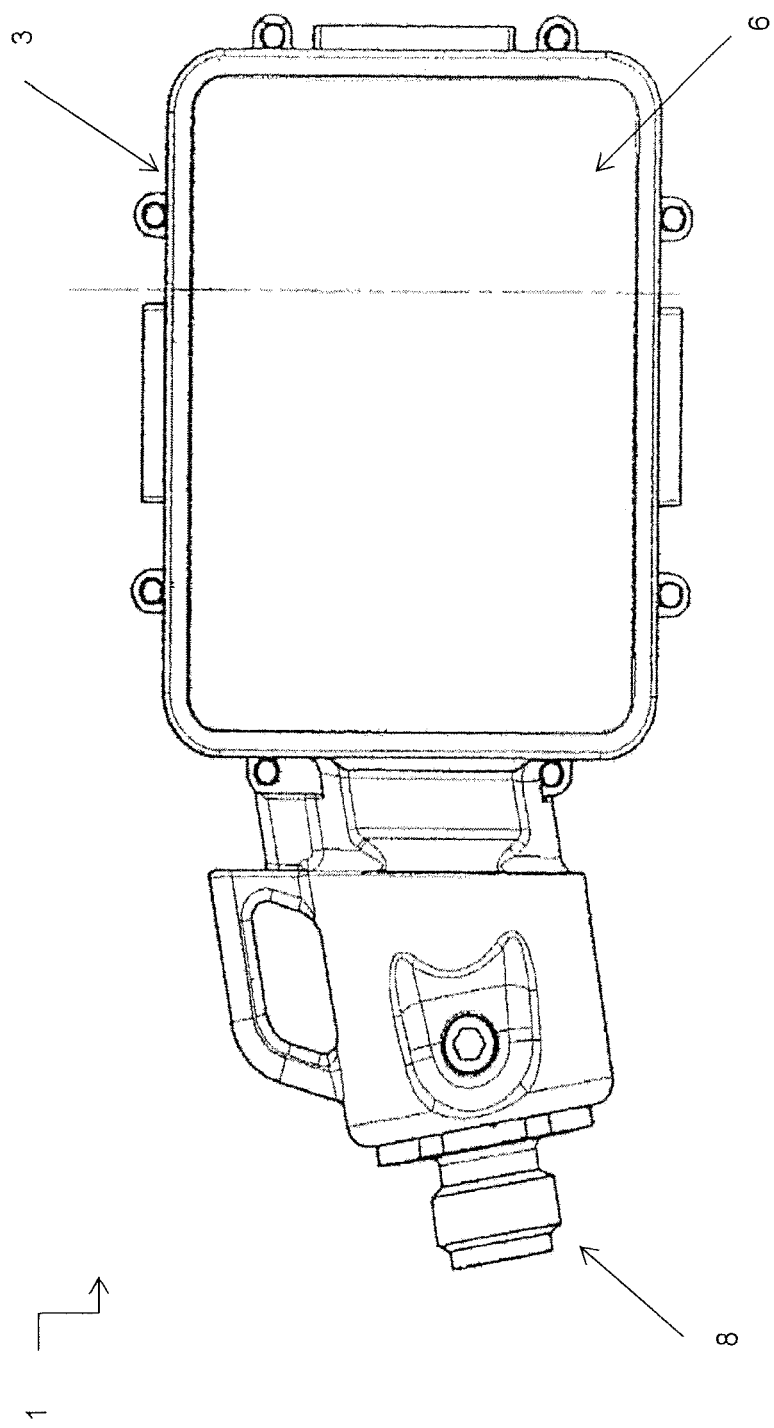
FIG. 1 is a front view of an embodiment of the instrumentation used in the present invention.
Figure 2:
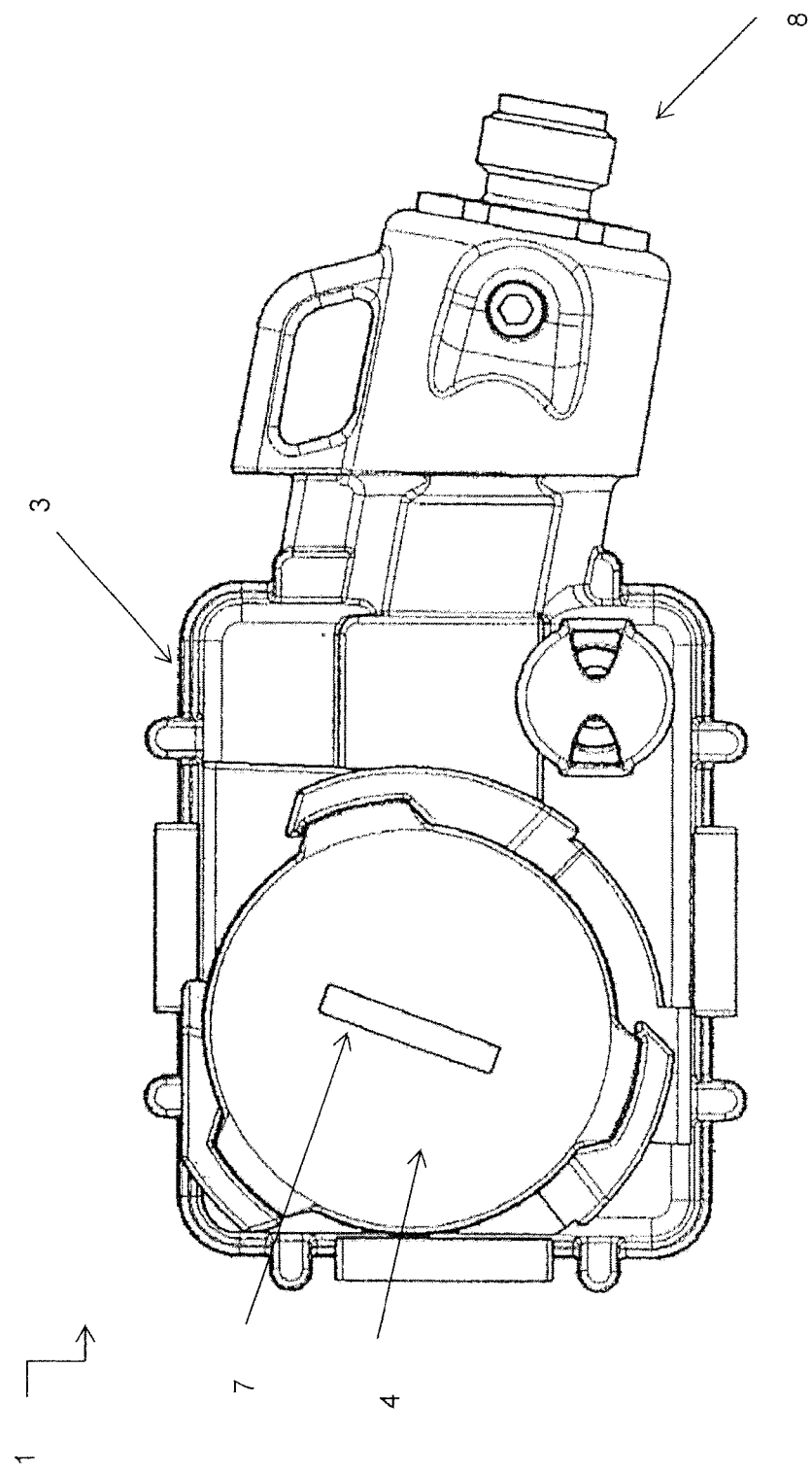
FIG. 2 is a rear view of the instrumentation of FIG. 1.
Figure 3:
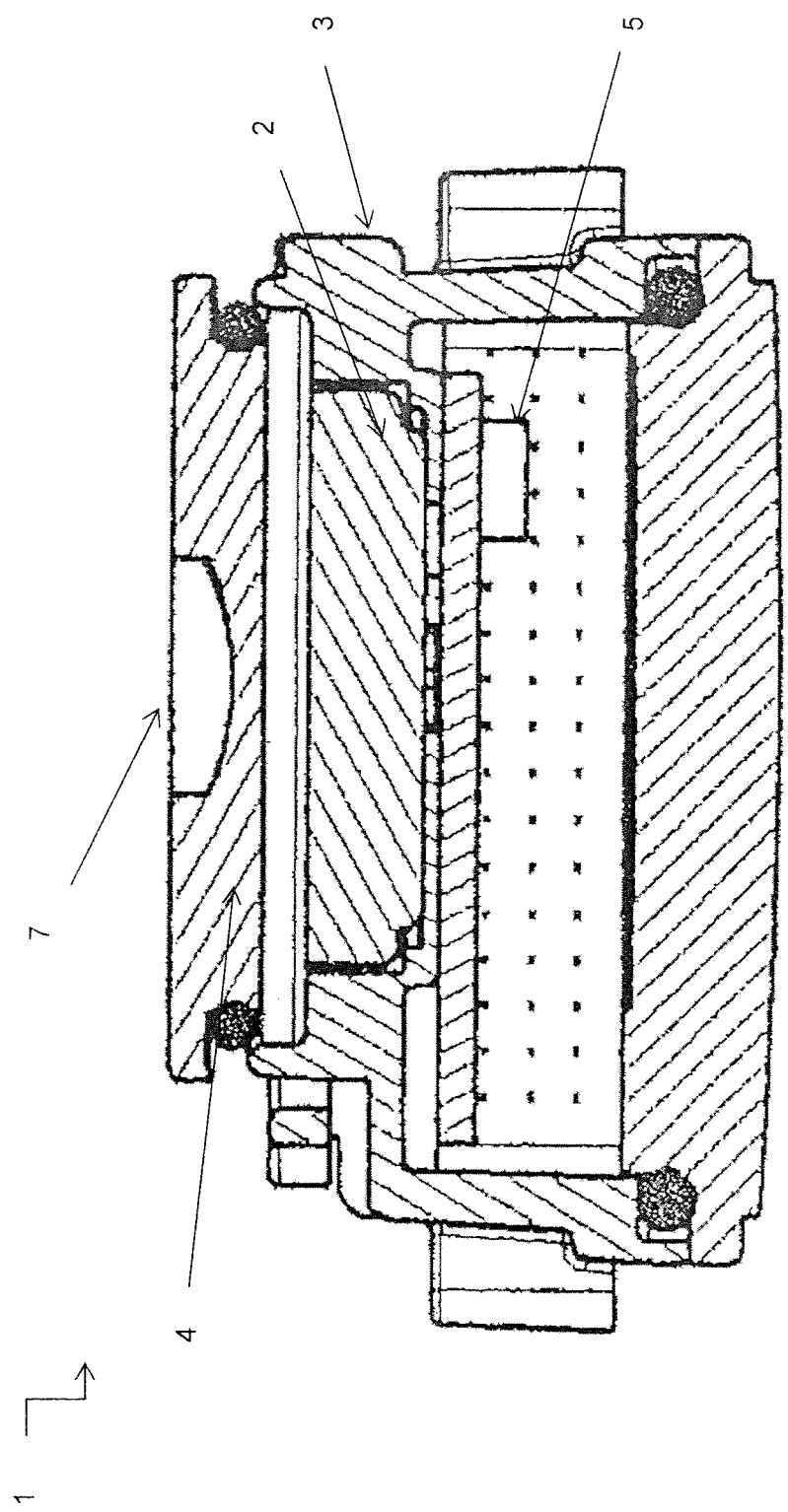
FIG. 3 is a side view of the instrumentation of FIG. 1.
Figure 4:
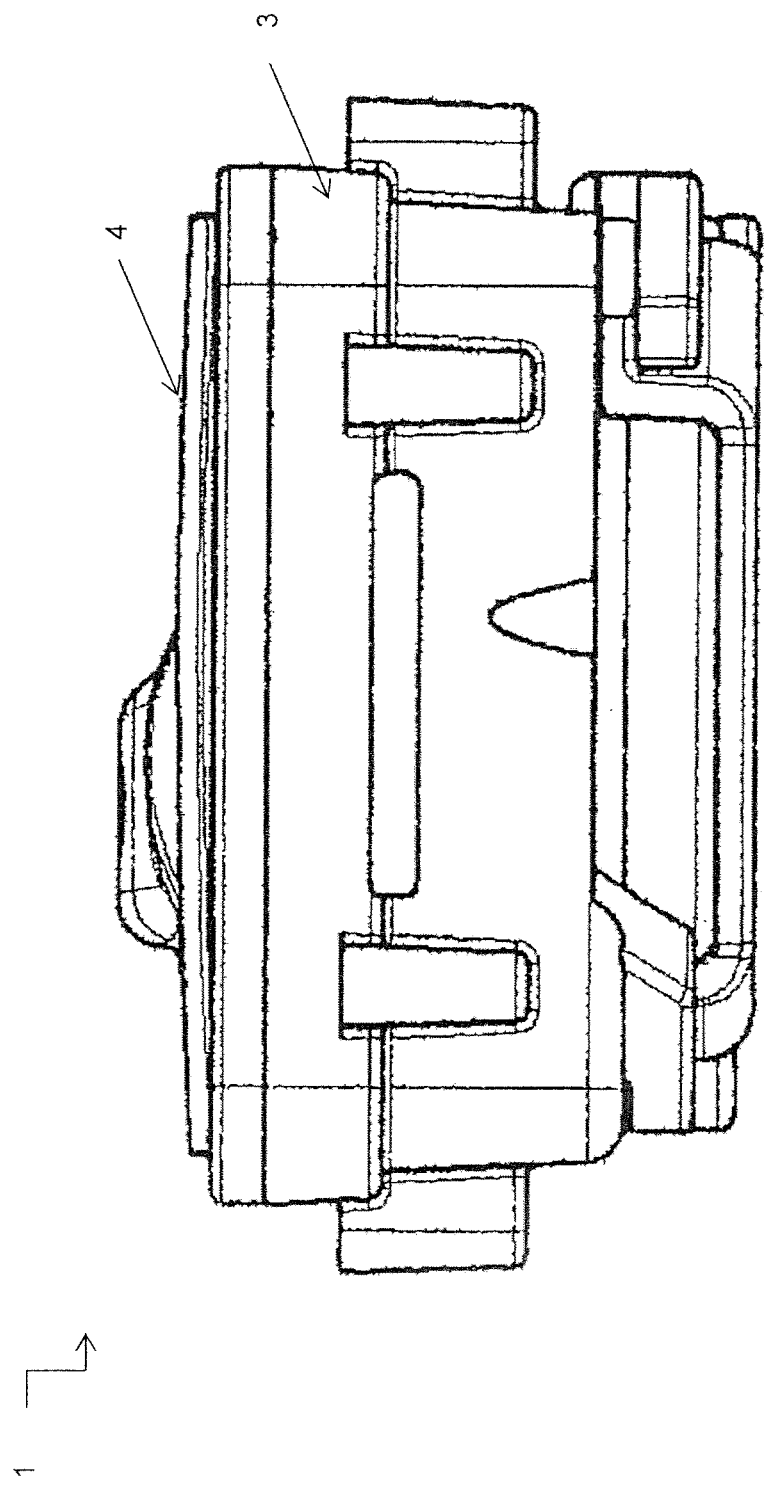
FIG. 4 is a sectional view of the instrumentation of FIG. 1.

The following detailed description refers to a particular embodiment shown in FIGS. 1-4.

In particular, with reference to FIGS. 1-4, instrumentation 1 for underwater use is described, such as, for example, a manometer for underwater use, having a watertight main body 3 that internally comprises electronic devices, the functionality of which must be protected from possible water/air infiltrations inside the main body 3.

The instrumentation 1 is powered in a stable manner by a battery 2, housed in a specially provided battery housing inside the main body 3. The battery 2 is capable of powering the instrumentation 1 also when the housing for the battery 2 is open. The battery housing is provided with a cover 4 capable of achieving a first open condition for the battery housing when the cover 4 is removed or not inserted, or a second, closed condition, when the cover 4 is instead applied to the battery housing. The cover 4 is applied, for example, by means of a bayonet coupling system, and is provided with a notch 7 on its upper side to facilitate rotation of the cover 4 for closing/opening operations.

A pressure sensor 5 is arranged inside the main body 3 that is capable of periodically detecting the pressure inside the main body 3 of the instrumentation 1. The pressure sensor 5 is able to transmit the measured values of this pressure to a central unit capable of storing these values and comparing them with each other and with predetermined values.

The instrumentation 1 is also provided with a display 6 positioned on the outside of the main body 3; the display 6 is activated by the central unit to transmit information to the user concerning the test to which the instrumentation 1 is subjected.

The instrumentation 1 is also provided with a hose 8 for connecting air cylinders located externally to the instrumentation 1.

Operatively, the test to check whether or not there has been a pressure drop inside the main body 3 in the instrumentation 1 takes place in the following manner.

Initially, the first open condition of the housing for the battery 2 is created, by removing the cover 4 if applied; the pressure sensor 5 is then able to measure the initial reference pressure P1 inside the main body 3 in this open condition and to transmit the value P1 to the central unit, which stores the value P1. Then, the second closed condition of the battery housing is created, by applying the cover 4 thereto, so as to seal the battery housing. In the same way as before, the pressure sensor 5 is also able to detect the pressure P2 inside the main body 3 in this closed condition and transmit the value P2 to the central unit for storage.

Periodically, for example every n seconds, the pressure sensor 5 detects the pressure $P_n$ at time $t_n$ inside said main body 3 and transmits the value $P_n$ to the central unit, which compares each value $P_n$ with the values P1 and P2 and with a predetermined threshold value P3, equal, for example, to X3.

In the case where the value Pn detected at time $t_n$ is less than the predetermined threshold value, i.e. in the case where it is established that there has been a pressure drop inside the main body 3 of the instrumentation 1 exceeding the permitted limit, the display 6, capable of transmitting information to the user related to the fact that such a pressure drop has occurred, is activated.

As an alternative to the display, this pressure drop could also be communicated to the user through other communication means, such as, for example, a warning light that lights up, or an audible device, like a buzzer or bell, which emits an audible alarm signal.

In this way, the instrumentation of the present invention enables carrying out self-diagnosis, in an extremely precise and immediate manner, of a possible pressure drop inside the body of the device, implemented through the real-time measurement performed by a sensor placed directly inside the instrument to be tested, and subsequent interpretation of the values according to a predetermined logic.

The check related to a pressure drop can be carried out automatically every time the battery is replaced, or also during manufacture of the instrument.

The above-described test for checking whether or not there has been a pressure drop inside the main body 3 of the instrumentation 1 may also include the further step wherein the instrumentation 1 for underwater use is inserted in a hermetically sealed container, such as an autoclave, and subjected to an external pressure P4, equal, for example, to X4, and therefore greater than pressure P2.

This further step enables checking whether or not this particularly high external pressure P4 (greater than atmospheric pressure) causes any deformation of the main body 3 of the instrumentation 1 for underwater use. In the affirmative case, the display 6 (or other visual or audible alarm) is activated to inform the user.

Through this further test step, further guarantees are obtained regarding the sealing of the instrumentation for underwater use.

Naturally, many modifications and variants regarding the described preferred embodiments will be evident to experts in the field, yet still remain within the scope of the invention.

Therefore, the present invention is not limited to the preferred embodiment described and illustrated herein by way of non-limitative example, but is defined by the following claims.

The invention claimed is:

1. A method for checking possible air leaks inside instrumentation for underwater use, the method comprising the following steps:
   a) detecting, by means of a pressure sensor, an initial reference pressure P1 inside a main body of said instrumentation for underwater use in a first condition, in which a housing for a battery is open;
   b) setting a second condition, in which the housing for the battery is closed;
   c) detecting, by means of said pressure sensor, a pressure P2 of air inside said main body of the instrumentation for underwater use after having set said second, closed condition of the housing for the battery;
   d) periodically detecting, at time tn, a value Pn of a pressure inside said main body of the instrumentation for underwater use in said closed, second condition of the housing for the battery;
   e) transmitting said values P1, P2, Pn to a central unit capable of storing said values and comparing them with one another;
   f) activating a communication device capable of emitting a signal perceptible by a user when a drop in a value of pressure Pn measured at time tn with respect to values P1 and P2 is greater than a predetermined threshold value P3;
   d') after step d), inserting said instrumentation for underwater use in a hermetically sealed container, such as an autoclave, and subjecting said instrumentation for underwater use to an external pressure P4 greater than P2; and
   e') after step d'), activating the communication device capable of emitting a signal perceptible by a user when internal pressure Pn, detected at time tn, exceeds tolerance values with respect to P2, due to deformation of the main body of said instrumentation for underwater use.

2. The method according to claim 1, wherein said communication device is capable of emitting a luminous, audible and/or graphical signal.

* * * * *